(12) United States Patent
Czerkowicz et al.

(10) Patent No.: US 9,032,183 B2
(45) Date of Patent: May 12, 2015

(54) METHOD AND APPARATUS FOR CONTENT DERIVED DATA PLACEMENT IN MEMORY

(75) Inventors: John Michael Czerkowicz, Somerville, MA (US); Arthur J. Beaverson, Boxborough, MA (US); Steven Bagby, Lexington, MA (US); Sowmya Manjanatha, Westford, MA (US)

(73) Assignee: SimpliVity Corp., Westborough, MA (US)

( * ) Notice: Subject to any disclaimer, the term of this patent is extended or adjusted under 35 U.S.C. 154(b) by 263 days.

(21) Appl. No.: 13/404,468

(22) Filed: Feb. 24, 2012

(65) Prior Publication Data

US 2013/0227209 A1 Aug. 29, 2013

(51) Int. Cl.
*G06F 17/30* (2006.01)
*G06F 12/08* (2006.01)

(52) U.S. Cl.
CPC ...... *G06F 17/30949* (2013.01); *G06F 12/0864* (2013.01); *G06F 17/30097* (2013.01)

(58) Field of Classification Search
CPC .......... G06F 12/0864; G06F 17/30949; G06F 17/30097
USPC ........................................................ 711/216
See application file for complete search history.

(56) References Cited

U.S. PATENT DOCUMENTS

| 5,396,470 | A | 3/1995 | Storn |
| 6,625,612 | B1 | 9/2003 | Tal et al. |
| 2004/0220975 | A1* | 11/2004 | Carpentier et al. ........... 707/200 |
| 2009/0157972 | A1* | 6/2009 | Byers et al. .................... 711/133 |
| 2011/0276781 | A1* | 11/2011 | Sengupta et al. ............. 711/216 |

FOREIGN PATENT DOCUMENTS

WO 2010151813 A1 12/2010

OTHER PUBLICATIONS

Jul. 8, 2013 International Search Report and Written Opinion in corresponding PCT/US2013/027296.
Per-Ake Larson and Ajay Kajla, "File Organization: Implementation of a Method Guaranteeing Retrieval in one Access", 8070 Communications of the Association of Computing Machinery, 27 (198) July, No. 7, New York, USA, pp. 670-677.

* cited by examiner

*Primary Examiner* — Charles Rones
*Assistant Examiner* — Andrew Russell
(74) *Attorney, Agent, or Firm* — Novak Druce Connolly Bove + Quigg LLP (57) ABSTRACT

Apparatus and method for placing data based on the content of the data in random access memory such that indexing operations are not required. A strong (e.g., cryptographic) hash is applied to a data element resulting in a signature. A weaker hash function is then applied to the signature to generate a storage location in memory for the data element. The weaker hash function assigns multiple data elements to the same storage location while the signature comprises a unique identifier for locating a particular data element at this location. In one embodiment a plurality of weak hash functions are applied successively to increase storage space utilization. In other embodiments, the assigned storage location can be determined by one or more attributes of the data element and/or the storage technology, e.g, long-lived versus short-lived data and/or different regions of the memory having different performance (e.g., access latency memory lifetime) characteristics.

14 Claims, 6 Drawing Sheets

METHOD AND APPARATUS FOR CONTENT DERIVED DATA PLACEMENT IN MEMORY

FIELD OF THE INVENTION

The present invention relates to the storage of data, and more particularly to a method and apparatus for placing data based on the content of the data in random access memory without requiring the use of an index.

BACKGROUND

A significant job of a file system, operating system or other storage manager is to place data on storage media. Where the data is written, and when and how it is accessed, can have a significant effect on performance. A traditional file system, e.g., POSIX file system, uses logical block numbering (LBN) addressing to access data. However, as storage densities are increasing faster than the access time, for a given data set size the time needed to access the data is increasing, and thus reducing accessibility.

One alternative is to build a file system or other storage system with an index to track each data element based on the content of the data itself. The index comprises a collection of records, wherein each record may consist of a cryptographic hash (signature) of the data element, a reference count, and a pointer to where the data element is located on disk. Typically, each data element is 4, 8, 16 or 256 KB in size, and thus there may be billions of records in the index. For commercial systems having billions of records the index may be from 64 to 256 gigabytes in size. In a storage system of this nature, operations on the index can be significant, and can often be the limiting factor in the system's performance.

Thus, there is an ongoing need for storage systems not limited by the density and/or access limitations of the prior art systems.

SUMMARY OF THE INVENTION

An apparatus and methods are provided for placing data on computer storage media based on the content of the data such that indexing operations are not required. More specifically, by applying a strong (e.g, cryptographic) hash to the data, the content of the data itself determines where it should be written in the storage media. The storage media comprises random access memory, and more preferably uniform random access memory such as solid state disk (SSD) memory.

In one embodiment, a strong (e.g., cryptographic) hash is applied to a data element resulting in a signature. A weaker hash function is then applied to the signature to generate a storage location in memory for the data element. The weaker hash function is expected to assign multiple data elements to the same storage location, while the signature comprises a unique identifier for locating a specific data element at this location. In one embodiment, a plurality of weaker hash functions, each providing a valid storage location, are applied successively until a free space in memory is found. In various other embodiments, the assigned storage location can be determined by a combination of the signature of the data and one or more attributes of the data element and/or the storage technology, e.g., different types of data (e.g. short-lived and frequently accessed versus long-lived and infrequently accessed) and different regions of the memory having different performance (e.g., access latency, memory lifetime) characteristics. In one embodiment, the memory is persistent. These and other advantages of the present invention are discussed below in various embodiments of the invention.

In accordance with one embodiment of the invention, a computer-implemented method of placing data in random access memory is provided, the data comprising a plurality of data elements and the memory having a plurality of storage locations, the method comprising:
  generating a signature for a data element by applying a strong hash function to the data element;
  assigning a storage location in the memory for the data element by applying a weak hash function to the signature;
  wherein the signature comprises a unique identifier of the data element while the weak hash function assigns multiple data elements to the same storage location.

In one embodiment, the assigning step includes applying a plurality of weak hash functions successively until a storage location having free space is located.

In one embodiment, the assigning step includes selecting one or more different weak hash functions to apply to the data element to preferentially assign the data element to a select region of storage locations in the memory.

In one embodiment, the selecting step is based one or more attributes of the data element.

In one embodiment, the different weak hash functions target different regions in memory having different performance characteristics.

In one embodiment, the performance characteristic is access time.

In one embodiment, the selecting step is based on an expected access requirement of the data element.

In one embodiment, the selecting step is based on an expected lifetime of the data element in the memory.

In one embodiment, the selecting step is based on an expected referencing requirement of the data element.

In one embodiment, the applying weak hash functions successively step increases space utilization of the memory.

In one embodiment, the method includes placing multiple data elements in the storage location in a first-in, first-out order.

In one embodiment, the random access memory comprises uniform random access memory having a constant worst case access time.

In one embodiment, the method includes maintaining a partial signature cache comprising a subset of bits of each signature.

In accordance with another embodiment of the invention, a computer system is provided comprising:
  a server having one or more processors and memory storing one or more programs for execution by the one or more processors;
  a signature generating module executed by the one or more processors for generating a signature for a data element by applying a strong hash function to the data element, wherein the signature comprises a unique identifier of the data element;
  a location assigning module executed by the one or more processors for applying a weak hash function to assign a storage location in memory for the data element, wherein the weak hash function assigns multiple data elements to the same storage location; and
  a storing module executed by the one or more processors for storing the data element at the assigned location of the random access memory.

In one embodiment, the location assigning module applies multiple weak hash functions successively to the data element for increasing space utilization of the memory.

In one embodiment, the system includes a selection module executed by the one or more processors for selecting one or more different weak hash functions to apply to the data element to preferentially assign the data element to a select region of storage locations in the random access memory.

In one embodiment, the selection is based on one or more attributes of the data element.

In one embodiment, the different weak hash functions target different regions in memory having different performance characteristics.

In one embodiment, the system includes the random access memory.

In one embodiment, the random access memory comprises uniform random access memory having a constant worst case access time.

DETAILED DESCRIPTION

Various embodiments of the present invention are now described with reference to the drawings. In the following description, for purposes of explanation, numerous specific details are set forth in order to provide a thorough understanding of one or more implementations of the present invention. It will be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The present invention may also be illustrated as a flow chart of a process of the invention. While, for the purposes of simplicity of explanation, the one or more methodologies shown in the form of a flow chart are described as a series of acts, it is to be understood and appreciated that the present invention is not limited by the order of acts, as some acts may, in accordance with the present invention, occur in a different order and/or concurrent with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

In various embodiments of the invention disclosed herein, the terms "data" and "data element" are used interchangeably. As used herein, data means an opaque collection of data, e.g., any sequence of symbols (typically denoted "0" and "1") that can be input into a computer, stored and processed there, or transmitted to another computer. As used herein, data includes metadata, a description of other data. Data written to a storage system as described herein may be data elements of the same size, or data elements of variable sizes. Some examples of data include information, program code, program state, program data, other data, and the like.

A "storage system" as used herein may be any system or application for storing data to storage, for example a file system, a block storage device, or other system. A storage system may use an identifier or name to reference each data element in storage. In one example, the name is a globally unique identifier (GUID), such as a hash of the data content, preferably a cryptographic hash or collision resistant hash of the data content. Other naming conventions are possible, as long as each data element has a name within the storage system that permits reconstituting the data stored to the user. In one embodiment a central server generates the names. Data names are usually fixed length binary strings intended for use by programs, as opposed to humans. The data written to a storage system as used herein may typically comprise many (e.g., billions) of small (e.g., 4, 8, 16 or 256 KB) pieces of data, of the same or variable size.

As used herein, computer storage media includes both volatile and non-volatile, removable and non-removable media for storage of information such as computer-readable instructions, data structures, program modules, or other data. Computer storage media includes RAM, ROM, EEPROM, FLASH memory or other memory technology, CD-ROM, digital versatile disc (DVDs) or other optical disk storage, magnetic cassettes, magnetic tape, magnetic disk storage or other magnetic storage devices, or any other medium which can be used to store desired information and which can be accessed by the computer.

As used herein, random access memory means computer storage media that can be accessed in any order without accessing or otherwise disturbing other data stored in the media, as opposed to rotating storage media or a tape Examples of random access memory include solid state disk, SRAM, DRAM, EEPROM and FLASH memory.

As used herein, uniform random access memory means computer storage media that can be accessed in any order with constant or uniform worst case access time. Examples include solid state disk, SRAM, ROM, OTP and NAND flash memory.

Figure 1:
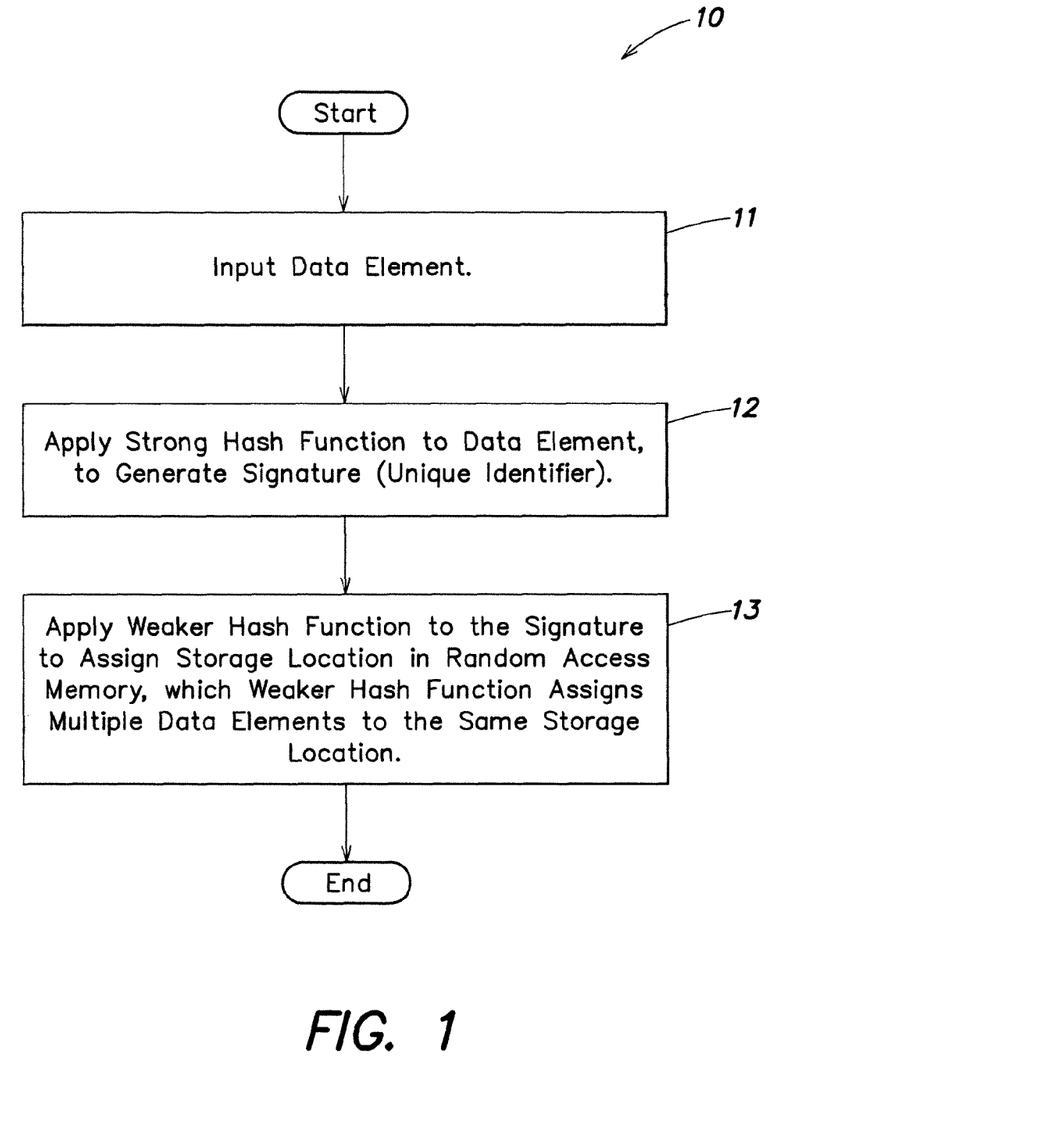
FIG. 1 is a flowchart of a process according to one embodiment of the invention for assigning a storage location to a data element.

FIG. 1 illustrates a method 10 according to one embodiment of the invention. A data element is input to the process, at step 11. A strong hash function is applied to the data element, to generate a signature (a unique identifier) at step 12. A weaker hash function is applied to the signature to assign a storage location for the data element in random access memory, at step 13. The weaker hash function is expected to assign multiple data elements to the same storage location, by this method.

One of the key properties of any hash function is its "collision resistance", namely the probability that the resulting hash value will be unique for a given input data. In the case of for example SHA-1, the collision resistance is very high, and one can assume that the probability of collision is so low that two input data elements that result in the same value when the SHA-1 function is applied to them, are the same data. In the present invention a strong hash function, having a low probability of collision, is used to generate a unique identifier for a data element. On the other hand, in the present invention, a weaker hash function that has a relatively high probability of collision is applied to the signature in order to assign a storage location to the data element in random access memory. It is thus expected that the weaker hash function will assign multiple data elements to the same storage location in memory, and the process relies on the unique identifier to find the particular data element in that location.

In one embodiment, the weak hash function may comprise a plurality of different weak hash functions that may be applied to a signature successively to optimize space is full, i.e., no slot available, then a second (different) hash function is applied to generate another memory location that may have space (an available slot). The specific location is not important, as long as there is space (a slot) for it.

Thus, one reason to use multiple weak hash functions is to provide an alternative location for data when another valid location is full, thus increasing the maximum efficiency/capacity of the storage. Basically, as the volume of data increases, even though the signatures are uniformly distributed, once the weak hash is applied to the signature there is a non-negligible probability of a collision. By providing an alternate weak hash algorithm, this can be used when there is a collision, thus increasing utilization of the storage, e.g., from 70% (with a single weak hash algorithm) to near 99% (with three weak hash algorithms).

Examples of strong hash functions as used herein include cryptographic hash functions such as SHA-1, MD5, or derivatives such as SHA-2, or newer hash functions such as BLAKE, Grøstl, J H, Keccak, and Skein. For the purposes of the invention the collision resistance property of a hash function is of primary interest, while other properties (e.g., pre-image resistance) may also be useful in a particular embodiment.

Examples of weak (also referred to as weaker or relatively weaker compared to the strong hash function) hash functions as used herein include simple algorithms such as bit masks, checksums, or fingerprints. For the purposes of the invention it may be assumed that the strong hash function produces a uniform distribution of hash values and that this property of a weak hash function is not required.

Figure 2:
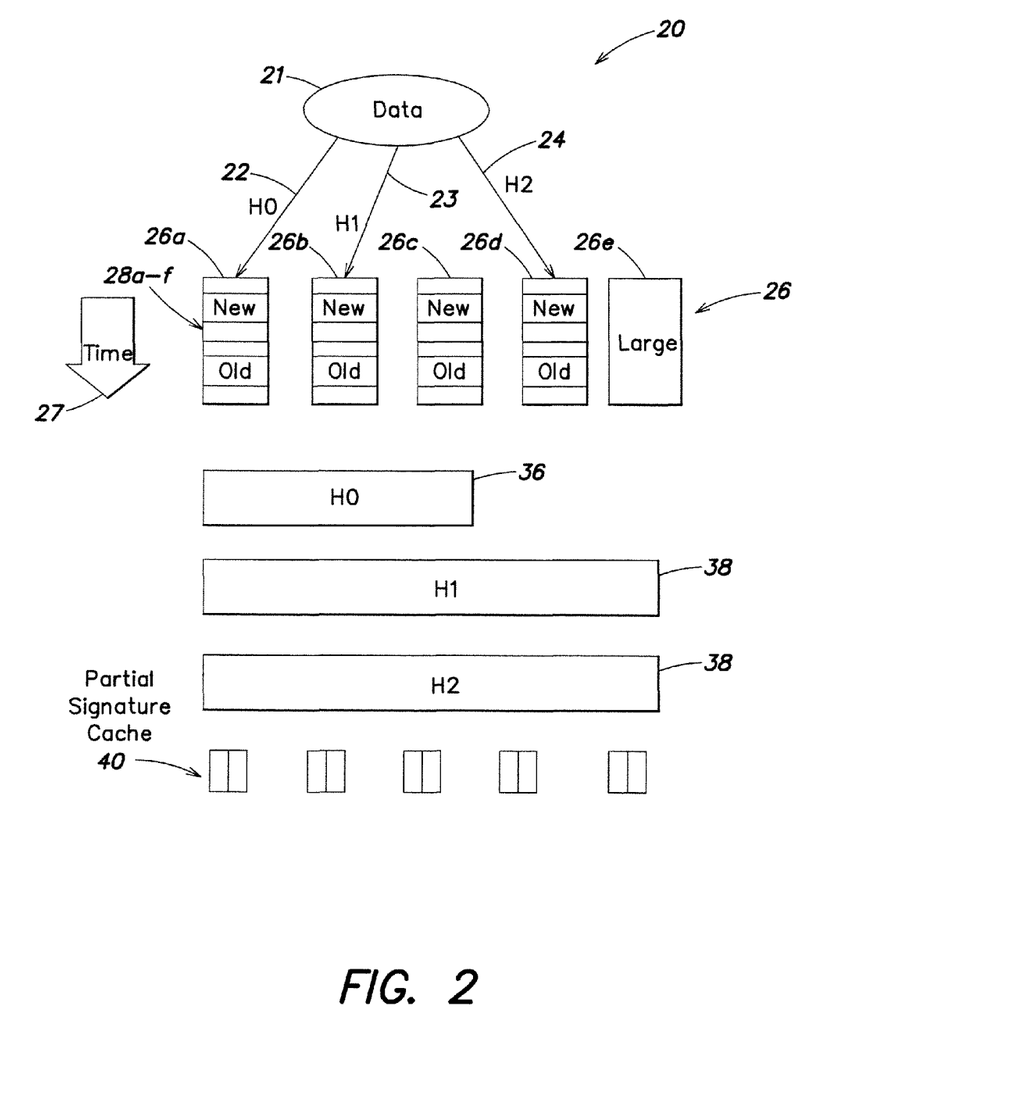
FIG. 2 is a block diagram illustrating one example of a system and method for assigning a storage location to a data element.

FIG. 2 is a schematic illustration of one embodiment of a system/architecture 20 for implementing the invention. Here a data element 21 is hashed using three hash functions, and three candidate memory locations are produced. A first hash function H0 targets a first memory location 26a. A second (different) hash function H1 (23) targets a second memory location 26b, and a further hash function H2 (24) targets yet another memory location 26d. The range of addresses that can be generated by the respective hash functions is illustrated below the memory locations, as three vertical bars 36-38. For example, the hash function H0 (22) spans the first three memory locations 26a-26c, the hash function H1 spans all 5 memory locations 26a-26e, and similarly the hash function H2 spans all 5 memory locations 26a-26e. This is just one example meant for illustrative purposes and is not limiting. The different memory locations may have the same or different access characteristics or other performance characteristics, and different memory locations may comprise the same or different memory technologies.

Each of memory locations 26a-26d is illustrated schematically in FIG. 2 as a series of slots (28a-f) arranged in a vertical stack and which are written to in time order as illustrated by arrow 27, with the oldest (first read) data element on the bottom 28f and the newest (most recently read) data element on the top 28a, e.g., first-in, first-out order. When writing a data element to storage, e.g., after applying a strong hash function to generate the signature and applying a weak hash function to the signature to generate the memory location, the assigned memory location is read, and if the data element already exists, no further action is taken. If the data element does not exist, the new data element goes on top, the top-most data element is pushed down, and in series order the data elements in the respective slots are pushed down such that the bottom-most data element is evicted.

In a read operation, the signature of the data element is already known. The signature may be stored in a database or other mapping structure, or may be contained in other data stored according to the invention in which case one or more data elements form Hash trees or Merkle trees. The weaker hash function is applied to the known signature to generate the storage location, and the storage location is then read. Each data element at the location must be inspected for a match with the signature to be read.

In one embodiment, a partial signature cache 40 can be used (see FIG. 2) for reducing the access time. For example if a data element's signature starts with 101xxxxx, and a candidate memory location's signature starts with 110xxxxx, the data element cannot live in that memory location. This avoids having to do a read at that memory location. The number of bits kept in the partial signature cache can be configured for greater read attenuation at the expense of more memory. The cache can be populated lazily (i.e., as the memory locations are read/written), or a separate scanning process can be used.

Figure 3:
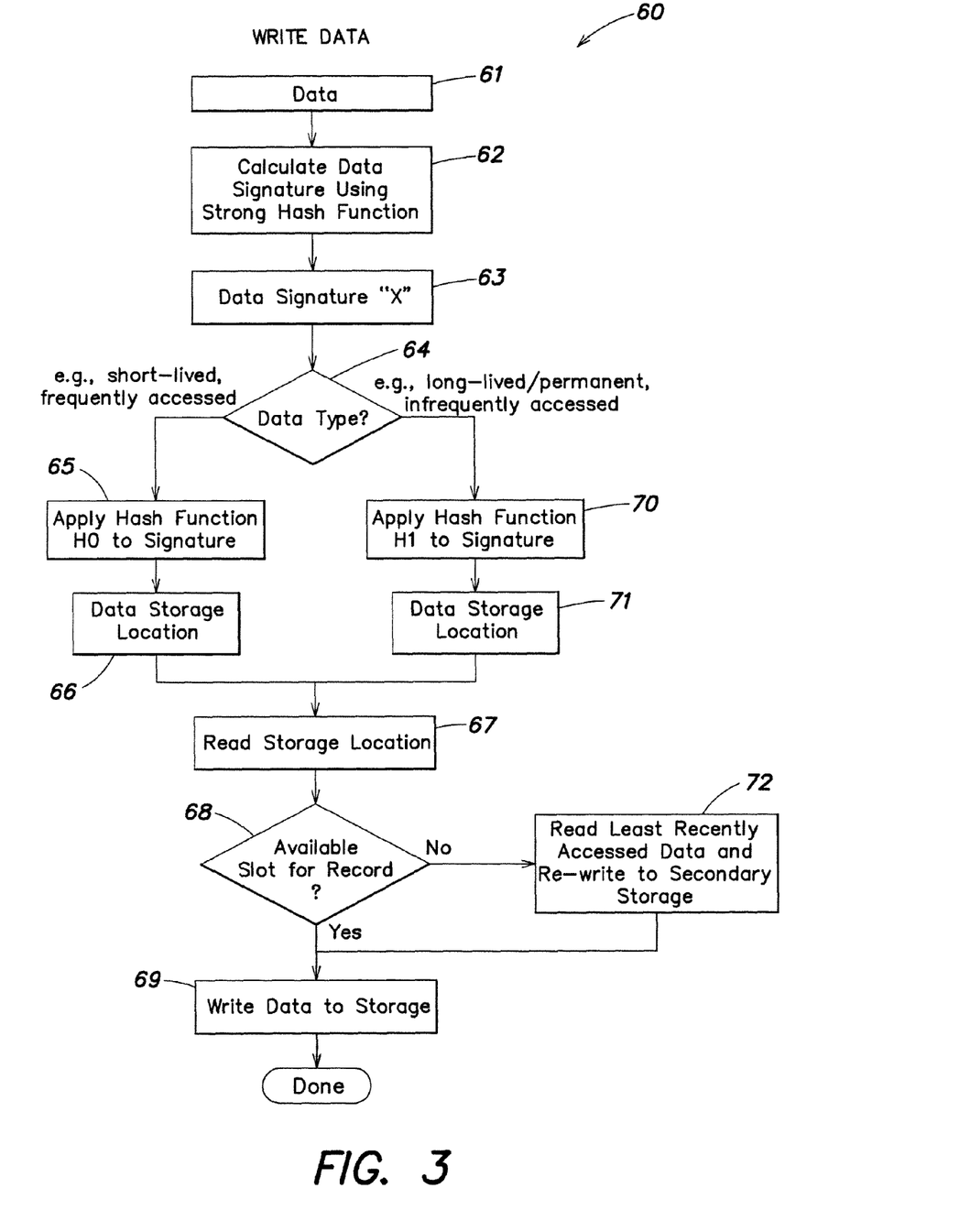
FIG. 3 is a flowchart of a process for writing data to storage according to one embodiment of the invention.

FIG. 3 illustrates one embodiment of a method 60 of writing data. The process begins at step 61, where a data element is input. A strong hash function is applied to the data element to calculate a data signature, at step 62. The output data signature "X" (63), is categorized by data type, at step 64. In this example, if the data type is determined to be a short-lived and frequently-accessed data element, then the process proceeds down the left hand side of FIG. 3 to step 65, where a hash function H0 is applied to the signature. The result is a data storage location, at 66, and the contents of that data storage location are read, at 67. If there is an available slot at the assigned storage location, at step 68, then the data element is written to that storage location at step 69, and the process is complete. Returning to step 68, if there is no available slot at the assigned location, the process proceeds to read the least recently accessed data and rewrite it to, for example, secondary storage at step 72, so that the new data element can be written to this location. Alternatively, the least recently access data can be moved to other storage or simply deleted.

Returning to step 64, if the data type is instead long-lived (e.g., relatively permanent) and infrequently-accessed, then the process proceeds down the right hand side of FIG. 3 to step 70 where a different hash function H1 is applied to the signature to produce a different storage (memory) location at step 71. The process then proceeds the same as previously described through steps 67-69 and 72.

Figure 4:
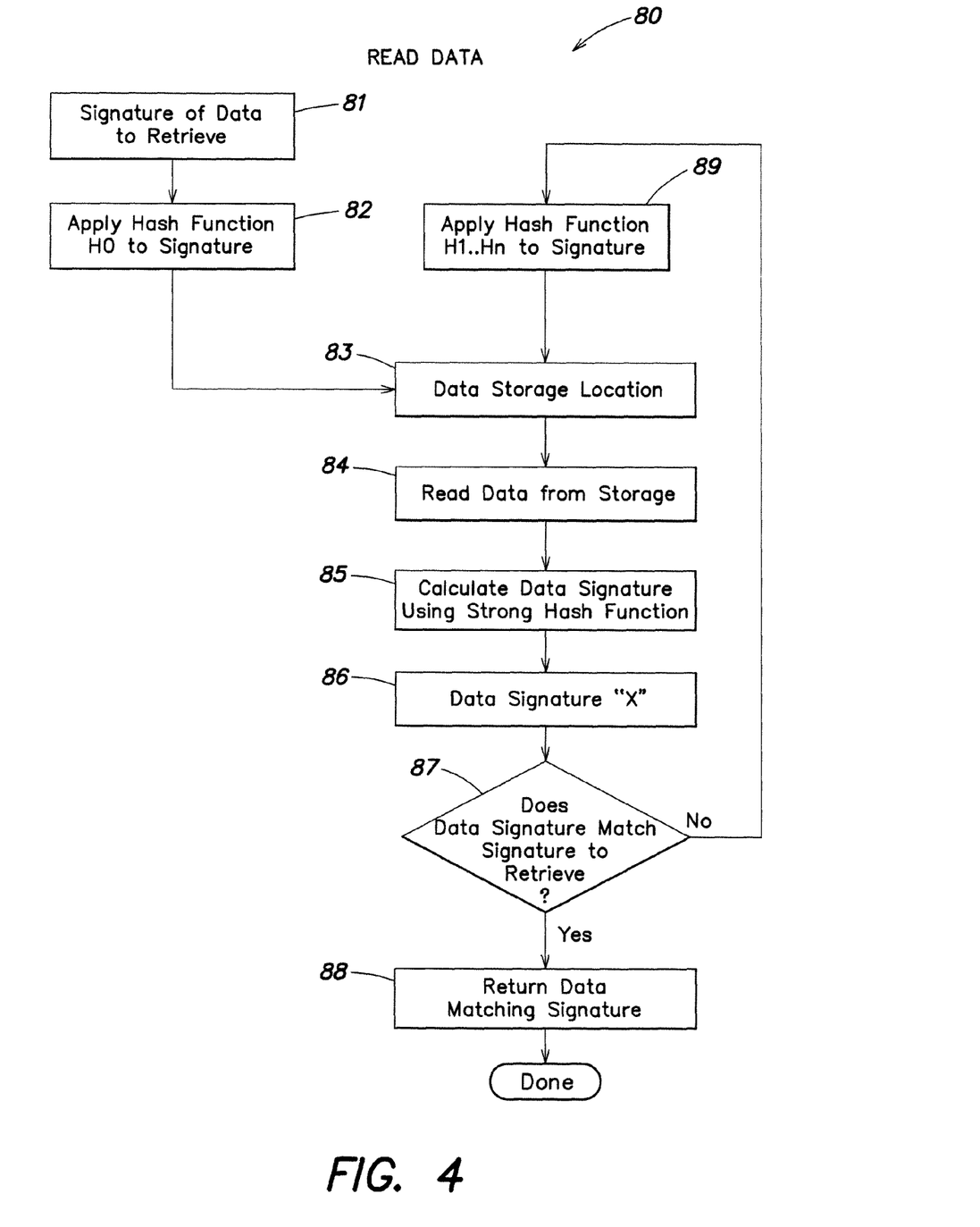
FIG. 4 is a flowchart of a process for reading data from storage according to one embodiment of the invention.

FIG. 4 illustrates one embodiment method 80 of reading data. Beginning at step 81, a signature of the data element is retrieved (e.g., from a metadata table), and a hash function H0 is applied to the signature, at step 82. The result is a data storage location, at 83, and the contents of the data location is read, at 84. A strong hash function is applied to the data signature at 85, producing a data signature "X" at 86, and it is then determined whether the data signature X matches the initial signature from step 81. If yes, then there is a match and the data element matching the signature is returned, at step 88, and the process is done. If not, the process proceeds to apply a different hash function, one or more of H1 ... Hn, to the signature, producing a data location and the process continues through steps 83-88 as previously described.

The categorization or selection step 64 as previously described, wherein data may be categorized for purposes of applying different weak hash functions to different data, can be implemented by using information received from other processes to determine what weak hash function to apply. As an example, a file system writes several kinds of data, such as file data, metadata, bitmaps, and directories. Each of these data types coming from the file system are denoted as such, enabling the process of the present invention to use these data types to preferentially assign the data to select storage locations in memory. As one example, file data may be categorized as relatively long-lived and infrequently accessed, while file system metadata may be categorized as short-lived and frequently accessed. Similarly, the storage system itself will have information concerning the performance characteristics of the different regions in memory for use in a selecting step that assigns a storage location in memory based upon one or more of the characteristics of the data and characteristics of the memory region.

Figure 5:
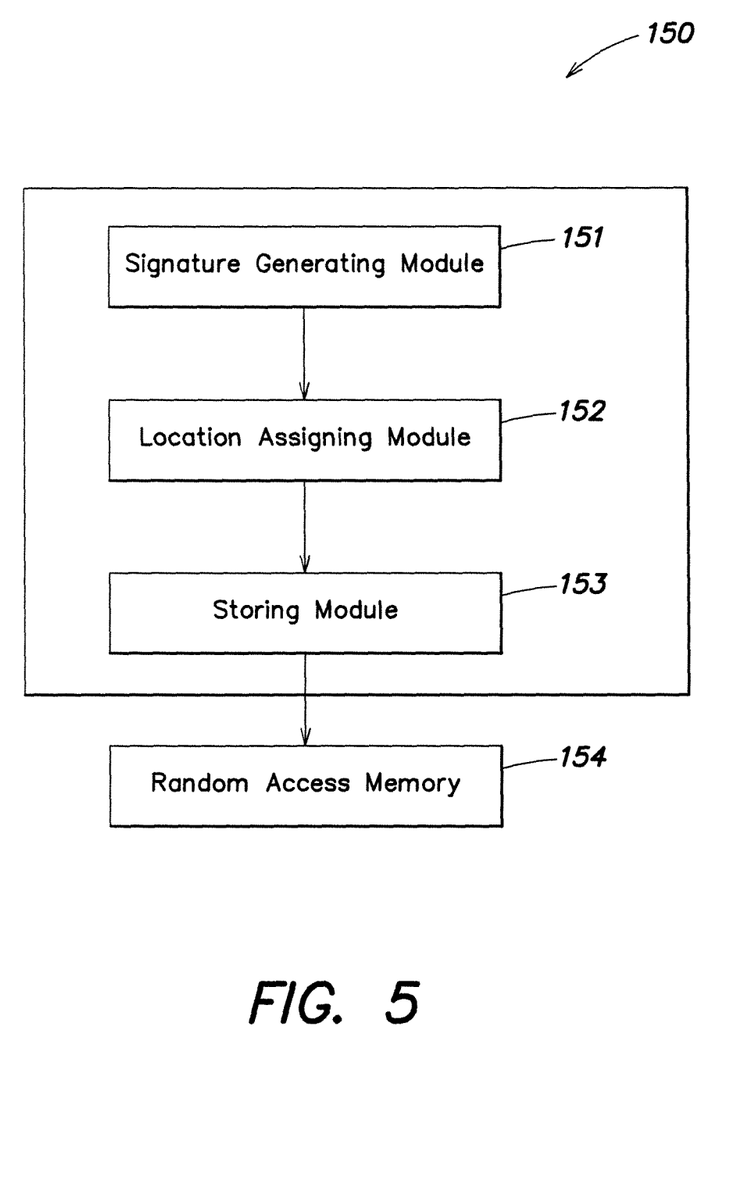
FIG. 5 is a schematic block diagram illustrating one example of a system for assigning a storage location to a data element.

FIG. 5 illustrates one embodiment of a computer system for implementing the present invention. The system 150 includes a signature generating module 151 for applying a strong hash function to a data element to generate a signature (unique identifier). A location module 152 applies the one or more weak hash functions to the signature to assign a storage location in random access memory, wherein the one or more weak hash functions may assign multiple data elements to the same storage location. The storing module 153 stores the data element at the assigned location, in the random access memory 154.

The previously described methods may be implemented in a suitable computing and storage environment, e.g., in the context of computer-executable instructions that may run on one or more computers. In a distributed computing environment (for example) certain tasks are performed by remote processing devices that are linked through a communications network and program modules may be located in both local and remote memory storage devices. The communications network may include a global area network, e.g., the Internet, a local area network, a wide area network or other computer network. It will be appreciated that the network connections described herein are exemplary and other means of establishing communications between the computers may be used.

A computer may include one or more processors and memory, e.g., a processing unit, a system memory, and system bus, wherein the system bus couples the system components including, but not limited to, the system memory and the processing unit. A computer may further include disk drives and interfaces to external components. A variety of computer-readable media can be accessed by the computer and includes both volatile and nonvolatile media, removable and nonremovable media. A computer may include various user interface devices including a display screen, touch screen, keyboard or mouse.

Figure 6:
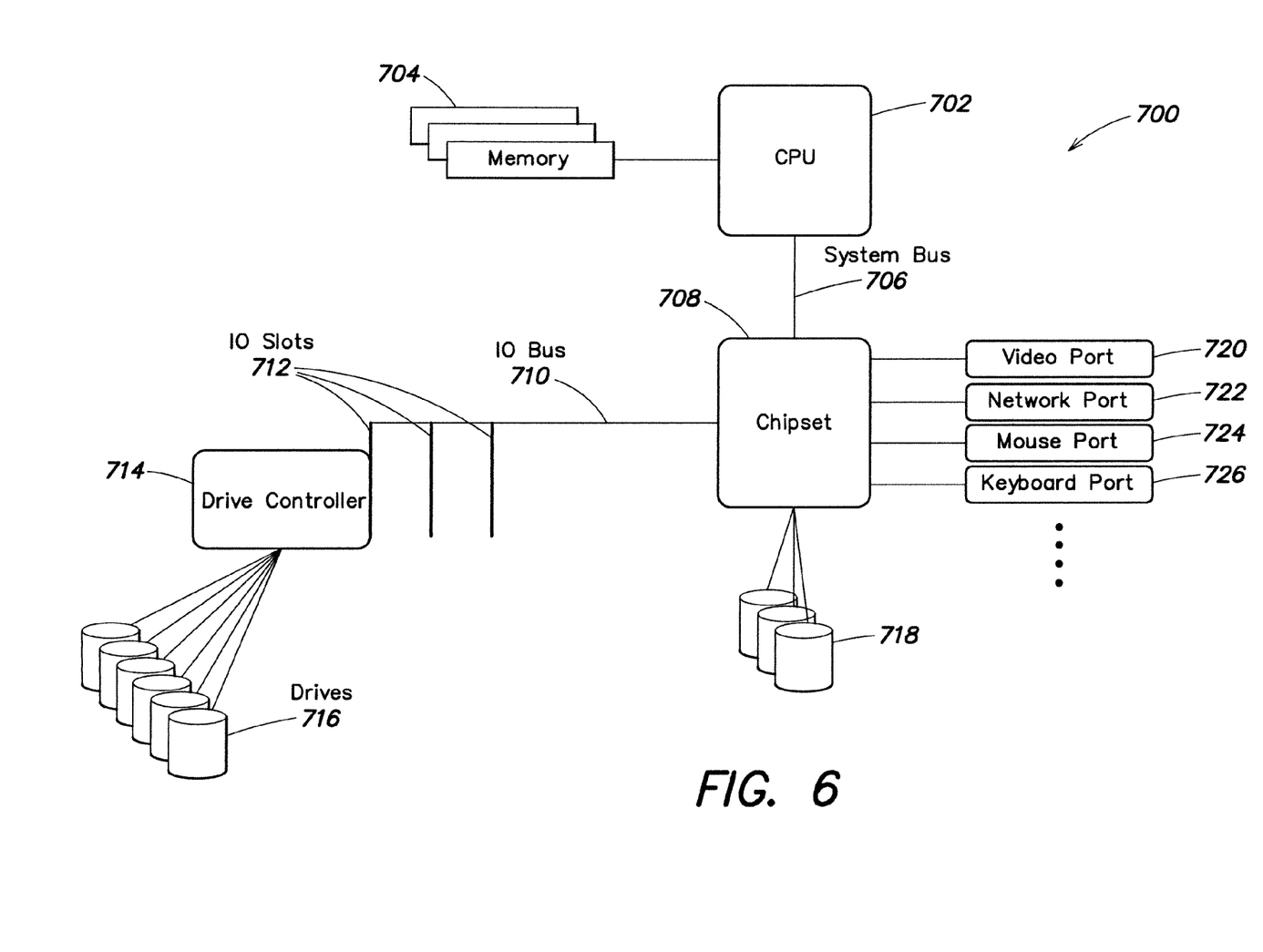
FIG. 6 illustrates one embodiment of a general system configuration for processing and storing data.

Referring now to FIG. 6, there is illustrated one example of a general system configuration 700 for communications between a computer and a plurality of disk storage devices. The disk storage can be any of various storage devices in which data are digitally recorded by various electronic, magnetic, optical or mechanical methods on a surface of one or more rotating disks, including hard disk drives, floppy disk drives and optical disk drives. A CPU 702 is shown attached to system memory 704, and a system bus 706 connects the CPU to chipset 708. The chipset is connected via an IO bus 710 and multiple IO slots 712, to any of various input/output devices, such as a drive controller 714 for connecting a plurality of disk drives 716. The chipset may also be connected to other storage devices 718. The chipset may include one or more of a video port 720, a network port 722, a mouse port 724, a keyboard port 726, etc.

What has been described above includes examples of the present invention. It is, of course, not possible to describe every conceivable combination of components or methodologies for purposes of describing the present invention, but one of the ordinary skill in the art will recognize that further combinations and permutations of the present invention are possible. Accordingly, the present invention is intended to embrace all such alternations, modifications and variations that fall within the present disclosure and/or claims.

The invention claimed is:

1. A computer-implemented method of placing data in random access memory based on the content of the data such that indexing operations are not required, the data comprising a plurality of data elements and the memory having a plurality of storage locations, each storage location able to store a plurality of data elements, the method comprising:
generating a signature for a data element by applying a strong hash function to the data element, the signature comprising a unique identifier for finding the data element in an assigned storage location;
assigning a storage location in the memory for the data element by applying a weak hash function to the signature;
wherein the weak hash function assigns multiple data elements to the same storage location.

2. The method of claim 1, wherein:
the assigning step includes determining a storage location in the memory for the data element by successively applying a plurality of weak hash functions until a storage location having free space is located.

3. The method of claim 1, wherein:
the memory includes regions with different performance characteristics each having a plurality of storage locations; and
the assigning step includes selecting one or more different weak hash functions that target storage locations in different regions in memory having different performance characteristics to preferentially assign the data element to a select region of storage locations in the memory.

4. The method of claim 3, wherein each data element has one or more attributes and the selecting step is based on one or more attributes of the data element.

5. The method of claim 3, wherein:
the performance characteristic is access time.

6. The method of claim 3, wherein:
the selecting step is based on a an expected access requirement of the data element.

7. The method of claim 3, wherein:
the selecting step is based on an expected lifetime of the data element in the memory.

8. The method of claim 3, wherein:
the selecting step is based on an expected referencing requirement of the data element.

9. The method of claim 1, wherein the random access memory comprises uniform random access memory having a constant worst case access time.

10. The method of claim 1, including:
maintaining a partial signature cache comprising a subset of bits of each signature.

11. A computer system placing data in random access memory based on the content of the data such that indexing operations are not required, the data comprising a plurality of data elements and the memory having a plurality of storage locations comprising:

a server having one or more processors and memory storing one or more programs for execution by the one or more processors;

a signature generating module executed by the one or more processors for generating a signature for each of a plurality of data elements by applying a strong hash function to the data element, wherein the signature comprises a unique identifier of the data element for finding the data element in an assigned storage location;

a location assigning module executed by the one or more processors for applying a weak hash function to assign a storage location in random access memory for the data element, wherein the memory has a plurality of storage locations and each storage location is able to store a plurality of data elements, and wherein the weak hash function assigns multiple data elements to the same storage location; and a storing module executed by the one or more processors for storing the data element at the assigned location of the random access memory.

12. The system of claim 11, further including:

the memory includes regions with different performance characteristics each having a plurality of storage locations; and a selection module executed by the one or more processors for selecting one or more different weak hash functions that target storage locations in different regions in memory having different performance characteristics to preferentially assign the data element to a select region of storage locations in the random access memory.

13. The system of claim 12, wherein:

each data element has one or more attributes and the selection is based on one or more attributes of the data element.

14. The system of claim 12, wherein:

the random access memory comprises uniform random access memory having a constant worst case access time.

* * * * *